United States Patent
Dong et al.

(10) Patent No.: US 12,333,294 B2
(45) Date of Patent: Jun. 17, 2025

(54) METHOD, APPARATUS, AND COMPUTER-READABLE STORAGE MEDIUM OF SEARCHING AND DISPLAYING IMAGE FORMING APPARATUS

(71) Applicant: Zhuhai Pantum Electronics Co., Ltd., Zhuhai (CN)

(72) Inventors: Liping Dong, Zhuhai (CN); Lujun Zhao, Zhuhai (CN); Minghui Yang, Zhuhai (CN)

(73) Assignee: Zhuhai Pantum Electronics Co., Ltd., Zhuhai (CN)

( * ) Notice: Subject to any disclaimer, the term of this patent is extended or adjusted under 35 U.S.C. 154(b) by 229 days.

(21) Appl. No.: 18/297,337

(22) Filed: Apr. 7, 2023

(65) Prior Publication Data

US 2023/0325176 A1 Oct. 12, 2023

(30) Foreign Application Priority Data

Apr. 8, 2022 (CN) .......................... 202210369024.9

(51) Int. Cl.
G06F 8/65 (2018.01)
G06F 3/12 (2006.01)

(52) U.S. Cl.
CPC .............. *G06F 8/65* (2013.01); *G06F 3/1203* (2013.01); *G06F 3/123* (2013.01); *G06F 3/1231* (2013.01); *G06F 3/1236* (2013.01)

(58) Field of Classification Search
None
See application file for complete search history.

(56) References Cited

U.S. PATENT DOCUMENTS

| 2009/0100422 A1* | 4/2009 | Abe | G06F 9/4411 |
| | | | 717/174 |
| 2015/0254036 A1* | 9/2015 | Konishi | G06F 3/1225 |
| | | | 358/1.13 |

FOREIGN PATENT DOCUMENTS

| CN | 1519692 A | | 8/2004 |
| CN | 109885266 A | * | 6/2019 |
| CN | 110121015 A | | 8/2019 |
| JP | 2005190167 A | | 7/2005 |

OTHER PUBLICATIONS

Zhao, Wei, "A Method of Printer Network Connection, Device, System and Mobile Terminal" (Year: 2019).*

* cited by examiner

*Primary Examiner* — Lewis A Bullock, Jr.
*Assistant Examiner* — Mark A Gooray
(74) *Attorney, Agent, or Firm* — ANOVA LAW GROUP, PLLC

(57) ABSTRACT

A method of searching and displaying an image forming apparatus includes obtaining a first information array of image forming apparatus through a first searching method; obtaining a second information array of image forming apparatus through a second searching method; determining if the first information array matches the second information array; determining an image forming apparatus discovered according to matching result is a wireless network image forming apparatus or a wired network image forming apparatus; and according to determining result, displaying a guide icon of driver installation of the image forming apparatus. The wireless network image forming apparatus has been connected to a network through a wireless network interface thereof.

16 Claims, 9 Drawing Sheets

1、Please single click "Print wireless network information page" to obtain the discovered network name and encryption method by an image forming apparatus. If the network name and encryption method are known, skip this step.

[Print wireless network information page]

2、Please input the name and password of the wireless network image forming apparatus require to connect Network name (SSID): (2.4GHz network only)

Encryption method:
WPA/WPA2

Password:

☐ Display password

[Return]  [Install]

FIG. 8A

"XXXXXXXXXX" Wants to visit your key "SW" of keychain.

Approve this visit?

( Always approve ) ( Deny ) ( Approve )

METHOD, APPARATUS, AND COMPUTER-READABLE STORAGE MEDIUM OF SEARCHING AND DISPLAYING IMAGE FORMING APPARATUS

CROSS-REFERENCE TO RELATED APPLICATION

This application claims priority to Chinese Patent Application No. 202210369024.9, filed on Apr. 8, 2022, the entire content of which is incorporated herein by reference.

TECHNICAL FIELD

The present disclosure relates to the field of image forming technology and, in particular, to a method, an apparatus, and a computer-readable storage medium of searching and displaying image forming apparatus.

BACKGROUND

An image forming apparatus is an apparatus that forms an image based on the imaging principle on a recording medium, and includes a printer, a copier, a facsimile machine, a multifunctional image making and copying apparatus, xerographic printing devices, and any other similar apparatuses.

Bonjour can automatically discover a computer, a device, and service in an IP network. A device using Bonjour automatically propagates its range information and listens to service information of other devices in the network, as if the devices are greeting each other. Therefore, it allows a system and the service in a local area network to be easily discovered even under a scenario that a network administrator is absent.

In macOS system, an operating system developed by Apple, adding an image forming apparatus relies on using the Bonjour protocol to search and obtain information of the image forming apparatus, discovering the image forming apparatus. However, among the existing technologies, when using the Bonjour protocol to search and discover an image forming apparatus, obtaining information of the image forming apparatus, and directing a user to operate to add the discovered network image forming apparatus, it is unstable to use the Bonjour protocol to obtain information of a printer or difficult to obtain all image forming apparatuses in a network or complete information of all image forming apparatuses. Furthermore, before adding the discovered network image forming apparatus, the user cannot distinguish the discovered image forming apparatus between a wired or a wireless image forming apparatus, which confuses the user and makes it inconvenient for the user to add an appropriate image forming apparatus.

SUMMARY

The present disclosure provides a method, an apparatus, and a computer-readable storage medium of searching and displaying an image forming apparatus to address issues in the existing technologies, including having difficulties in obtaining complete information of an image formation apparatus, incapability of distinguishing a wired image forming apparatus from a wireless image forming apparatus, and the inconvenience for a user to install a driver of the image forming apparatus or add an appropriate image forming apparatus.

One aspect of the present disclosure provides a method of searching and displaying an image forming apparatus. The method includes obtaining a first information array of image forming apparatus through a first searching method; obtaining a second information array of image forming apparatus through a second searching method; determining if the first information array matches the second information array; determining an image forming apparatus discovered according to matching result is a wireless network image forming apparatus or a wired network image forming apparatus; and according to determining result, displaying a guide icon of driver installation of the image forming apparatus. The wireless network image forming apparatus has been connected to a network through a wireless network interface thereof.

Another aspect of the present disclosure provides an electronic apparatus. The electronic apparatus includes a memory containing a computer program for performing a method of searching and displaying an image forming apparatus; and a processor coupled to the memory and, when the computer program is executed, configured to: obtain a first information array of image forming apparatus through a first searching method; obtain a second information array of image forming apparatus through a second searching method; determine if the first information array matches the second information array; determine an image forming apparatus discovered according to matching result is a wireless network image forming apparatus or a wired network image forming apparatus; and according to determining result, display a guide icon of driver installation of the image forming apparatus. The wireless network image forming apparatus has been connected to a network through a wireless network interface thereof.

Another aspect of the present disclosure provides a non-transitory computer-readable storage medium that includes a stored program. When being executed, the stored program causes a computer to perform a method of searching and displaying an image forming apparatus. The method includes: obtaining a first information array of image forming apparatus through a first searching method; obtaining a second information array of image forming apparatus through a second searching method; determining if the first information array matches the second information array; determining an image forming apparatus discovered according to matching result is a wireless network image forming apparatus or a wired network image forming apparatus; and according to determining result, displaying a guide icon of driver installation of the image forming apparatus. The wireless network image forming apparatus has been connected to a network through a wireless network interface thereof.

BRIEF DESCRIPTION OF THE DRAWINGS

In order to better illustrate the technical solutions of embodiments of the present disclosure, the following will briefly introduce the accompanying drawings that are used in the embodiments. Obviously, the accompanying drawings in the following description are only some embodiments of the present disclosure. Those persons of ordinary skill in the art can also obtain other drawings based on the illustrated drawings without paying creative efforts.

FIG. 8A depicts a schematic diagram of a displayed interface for manually inputting a network segment SSID and password according to embodiments of the present disclosure.

DETAILED DESCRIPTION OF THE EMBODIMENTS

In order to better understand the technical solutions of the present disclosure, embodiments of the present disclosure will be described in detail below in conjunction with the accompanying drawings.

It will be appreciated that the described embodiments are some rather than all of embodiments of the present disclosure. Other embodiments conceived by those having ordinary skills in the art on the basis of the described embodiments without inventive efforts should be included within the scope of the present disclosure.

The terms used in the embodiments of the present disclosure are only for the purpose of describing specific embodiments and are not intended to limit the present disclosure. As used in the embodiments of this application and the claims, the singular forms "a" and "the" are intended to include the plural forms as well, unless the context clearly specifies otherwise.

The term "and/or" used in this application is only an association relationship to describe related objects, indicating that there can be three kinds of relationships, for example, A and/or B, which can mean that A exists alone, A and B exist at the same time, and B exists alone. In addition, the character "/" in this document generally indicates that the related objects are an "or" relationship.

Although the terms "first", "second", "third", etc. may be used to describe ways or means in the embodiments of the present disclosure, these ways or means should not be limited by these terms. These terms are only used to distinguish terminals from one another. For example, without departing from the scope of embodiments of the present disclosure, a first apparatus may also be referred to as a second apparatus, and similarly, a second apparatus may also be referred to as a first apparatus.

Figure 1:
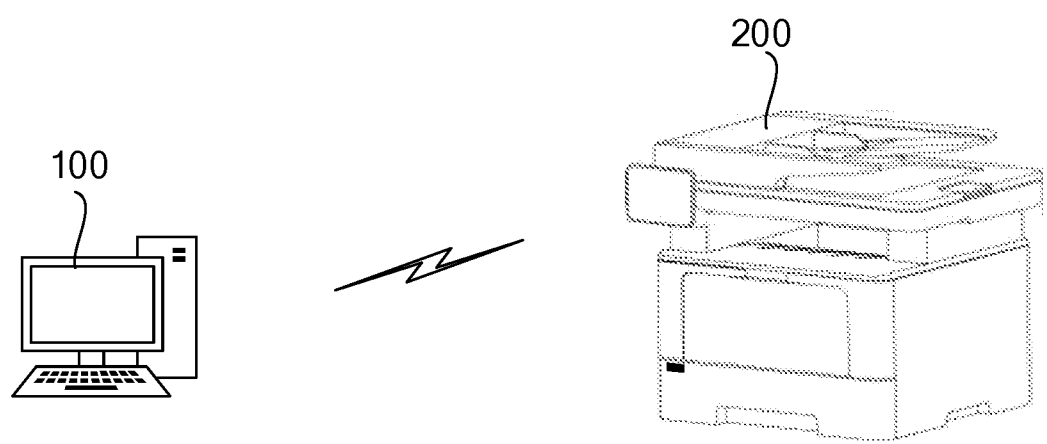
FIG. 1 depicts a schematic diagram of an image forming system according to embodiments of the present disclosure.

FIG. 1 depicts a schematic diagram of an image forming system according to embodiments of the present disclosure. A control device 100 and an image forming apparatus 200 are shown in FIG. 1. The control device 100 and the image forming apparatus 200 can use a USB (Universal Serial Bus) via a wired or a wireless manner to establish a communication connection. The control device 100 includes, but is not limited to, a desktop computer, a laptop computer, a networked computer, a palmtop computer (a portable computer), and other computer devices. The image forming apparatus is a device having at least one function related to image formation. The function related to image formation may include, but is not limited to, a printing function, a scanning function, a copying function, and a facsimile function. For example: single-function printer (e.g., an image forming apparatus only having printing function), multi-function printer (e.g., an image forming apparatus having printing, copying, scanning, and/or facsimile functions, as well as an option to selectively set the paper cassette quantity), digital composite machine (e.g., primarily having copying function, having standard or optional functions like printing, scanning, and facsimile, applying digital principles for file output by laser printing, being able to edit images and texts as needed, having a large capacity paper tray, and possessing capabilities of high memory, large hard disk, strong network support, and multitasking parallel processing).

Figure 2:
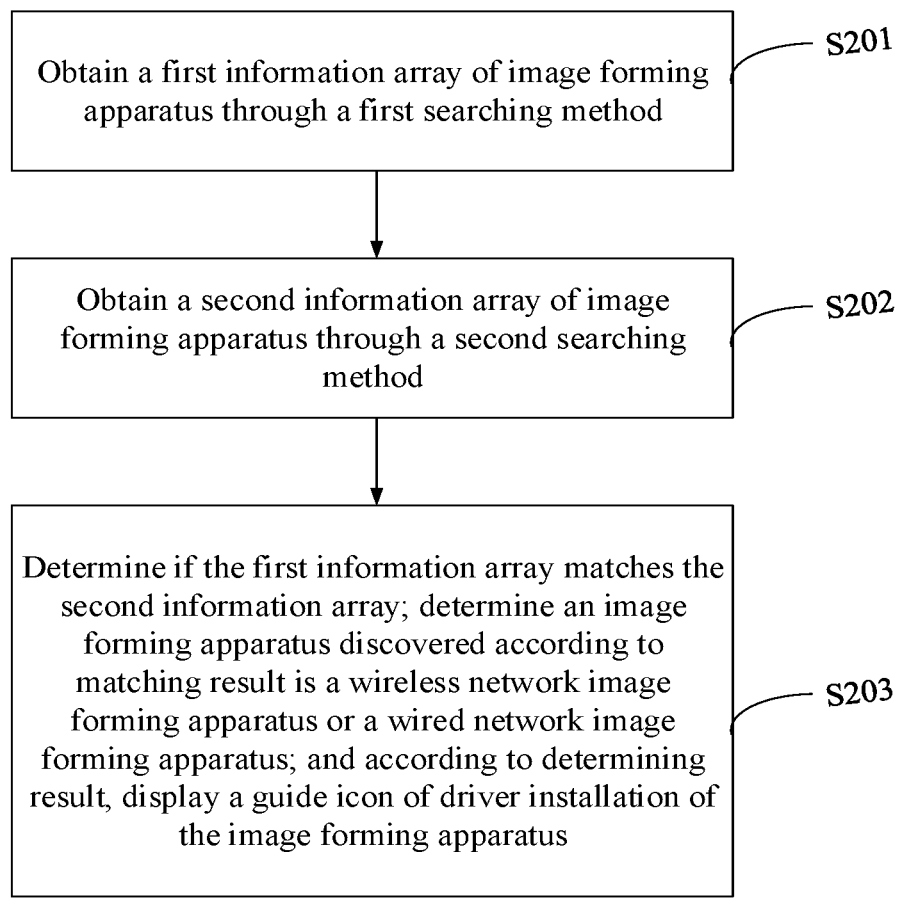
FIG. 2 depicts a process diagram of a method of searching and displaying an image forming apparatus according to embodiments of the present disclosure.

FIG. 2 depicts a process diagram of a method of searching and displaying an image forming apparatus according to embodiments of the present disclosure. In some embodiments, the method of searching and displaying the image forming apparatus includes following exemplary steps.

Step S201: obtaining a first information array of image forming apparatus through a first searching method.

The first searching method according to embodiments of the present disclosure is a searching method based on the bonjour searching protocol or a searching protocol with the same/similar function. The first information array includes at least one device feature information of the image forming apparatus. The device feature information includes device name, IP (Internet Protocol), UUID (Universally Unique Identifier), hostname, and/or user-defined network identifier.

Step S202: obtaining a second information array of image forming apparatus through a second searching method.

The second searching method according to embodiments of the present disclosure is a searching method based on the SLP (Service Location Protocol) search protocol or a searching method based on a searching protocol with the same/similar function. The second information array is at least one device feature information of the image forming apparatus. The device feature information includes device name, IP, UUID, hostname, MAC (Media Access Control) address, and/or user-defined network identifier.

Step S203: determining if the first information array matches the second information array. According to matching result, a discovered image forming apparatus is determined as a wireless network apparatus or a wired network apparatus. According to determining result, a guide icon of driver installation of the image forming apparatus is displayed, where the wireless network image forming apparatus has been connected to a network through a wireless network interface thereof.

Embodiments of the present disclosure describe determining if the first information array matches the second information array. According to matching result, the discovered image forming apparatus is determined to be the wireless network apparatus or the wired network apparatus. According to determining result, displaying the guide icon of driver installation of the image forming apparatus includes parsing the first information array of an image forming apparatus obtained through the first searching method and the second information array of an image forming apparatus obtained through the second searching method. If the first information array and the second information array have the same name (for example, hostname, UUID, device name, etc.) or IP address, etc., it is determined that the first information array matches the second information array. Optionally, the first information array can be further integrated into the second information array, including part of the device feature information of the first information array is integrated into the second information array, the first information array is integrated into the device feature information of the second information array, part of the device feature information of the first information array is integrated into part of the device feature information of the second information array, or the first information array is directly integrated into the second information array. As long as the integrated information array contains device feature information for adding a device and device feature information for distinguishing the wired network apparatus from the wireless network apparatus. The displaying the guide icon of driver installation of the image forming apparatus further includes parsing the first information array, the second information array, or the integrated device feature information, for example, parsing the MAC address or the user-defined network identifier and obtaining distinguishable wired device feature information of the wired network image forming apparatus and wireless device feature information of the wireless network image forming apparatus. According to the wired device feature information and the wireless device feature information, an interface is updated, directing the guide icons of the driver installation of the wired network image forming apparatus and the wireless network image forming apparatus to be highlight-displayed or gray-displayed. The wireless network image forming apparatus is connected to the network through its wireless network interface.

In addition, the first information array and/or the second information array can also be parsed. According to parsing result, the discovered image forming apparatus is determined as the wired network image forming apparatus or the wireless network image forming apparatus. When according to the parsing result, the discovered image forming apparatus is determined as the wired network image forming apparatus and the discovered image forming apparatus has a wireless network communication interface, the guide icon directing driver installation of the wireless network apparatus is highlight-displayed or gray-displayed. Optionally, parsing the first information array, the second information array, or the integrated device feature information exemplarily includes parsing the MAC address or the user-defined network identifier. When according to parsing result, the discovered image forming apparatus is determined as a wired network image forming apparatus (an image forming apparatus connected to the network through a wired network interface), moreover, through parsing other obtained device feature information of the image forming apparatus, the image forming apparatus is determined to have a wireless network communication interface, the guide icon directing driver installation of the wired network apparatus is highlight-displayed or gray-displayed.

An image forming apparatus in the network can use the NSNetServiceBrowser class to discover local services, and then use the instance's searchForServicesOfType method to search for services. The searchForServicesOfType method can specify the service type and the domain to be searched, for example, through "[browser searchForServicesOfType: @"_ipps._tcp" inDomain:@"local."]", searching for the "_ipps._tcp." service in the domain of "local." and through "[browser searchForServicesOfType: @"_pdl-datastream._tcp" inDomain:@"local."]", searching for the "_pdl-datastream._tcp." service in the domain of "local.", respectively.

In the searching and displaying method provided in embodiments of the present disclosure, when the Bonjour search protocol is used to search for an image forming apparatus, a sub-thread is timed to perform SLP search at the same time. When the same image forming apparatus is discovered by both Bonjour and SLP search protocols, the existence of corresponding image forming apparatus is then confirmed, ensuring the search result of a network image forming apparatus is more accurate and stable. This method reduces the instability of the searching result, originated from the incomplete search for an image forming apparatus in the network, when only Bonjour search protocol is used for searching an image forming apparatus. Meanwhile, by parsing the hardware MAC address of the image forming apparatus, the discovered image forming apparatus can be determined as the wired network image forming apparatus or the wireless network image forming apparatus.

The disclosed methods for searching and displaying of the image forming apparatus(es) may further improve stability and reliability of the search results of image forming apparatuses. In one application scenario, when using the Bonjour protocol to search and discover an image forming apparatus, obtaining information of the image forming apparatus, and directing a user to operate to add the discovered network image forming apparatus, it may be unstable to use the Bonjour protocol to obtain information of a printer or it may be difficult to obtain all image forming apparatuses in a network or complete information of all image forming apparatuses. Before adding the discovered network image forming apparatus, the user may not be able to identify the discovered image forming apparatus between a wired or a wireless image forming apparatus, which confuses the user and makes it inconvenient for the user to add an appropriate image forming apparatus. For example, when only the Bonjour protocol is used to search for image forming apparatuses, the obtained search results may include image forming apparatuses A and B. However, in actual applications, in addition to image forming apparatuses A and B, the search results may further include image forming apparatus C. Therefore, image forming apparatus C is missing in the search results in this case. In another example, when only the Bonjour protocol is used to search for image forming apparatus, the first search results may include image forming apparatuses A and B, and the second search results may include image forming apparatuses A and C or image forming apparatuses B and C, resulting in unstable search results for image forming apparatuses. Still in another example, when only the Bonjour protocol is used to search for image forming apparatuses, the search results may include the device feature information of image forming apparatuses A and B and their corresponding parts. When protocols other than the Bonjour protocol are used to search for image forming apparatuses, the search results may include, in addition to the device feature information of image forming apparatuses A and B and their corresponding parts, feature information of other image forming apparatus C and their corresponding apparatuses, or other device feature information of image forming apparatuses A and B. Therefore there is instability in the search results of image forming apparatuses. Understandably, the above is only an exemplary explanation and is not specifically limited here.

The searching and displaying method of embodiments of the present disclosure further includes: after directing the guide icon of the driver installation of the wireless network image forming apparatus or the wired network image forming apparatus to be highlight-displayed or gray-displayed, when one image forming apparatus is discovered, a user operation instruction on the highlight-displayed guide icon is obtained and device information of the image forming apparatus is prompted; When one image forming apparatus is discovered, a user operation instruction on the gray-displayed guide icon is obtained and prompt information is displayed to guide the user to execute a connecting operation of the image forming apparatus; When multiple image forming apparatuses are discovered, a user operating instruction on the highlight-displayed guide icon is obtained and device information of the multiple image forming apparatuses is displayed, directing the user to select an image forming apparatus based on the device information of the multiple image forming apparatuses to perform a network configuration operation and/or a driver installation operation.

The searching and displaying method of embodiments of the present disclosure further includes: searching for an image forming apparatus through a third searching method. A guide icon of driver installation of the corresponding image forming apparatus includes a driver installation manner corresponding to the image forming apparatus being at least one of the three connection modes of the image forming apparatus, the three connection modes including USB (Universal Serial Bus) connection, wired network connection, and wireless network connection. According to the displayed guide icon of driver installation of the image forming apparatus, the user operation instruction is obtained, the driver of the image forming apparatus is installed, and the image forming apparatus is added. In addition, when an image forming apparatus is discovered through the third searching method, the discovered image forming apparatus is determined if it belongs to a same network as the discovered image forming apparatus through the first searching method or the second searching method. if they do not belong to the same network, the network configuration operation and/or the driver installation operation are executed on the image forming apparatus discovered through the third searching method. Among them, for executing driver installation of the image forming apparatus through the USB connection, by calling the callback function, when the USB-connected image forming apparatus is connected to or removed from the system, the asynchronous callback is triggered, and the computer device connected through the USB is monitored.

The searching and displaying method provided in embodiments of the present disclosure obtains the first information array of the image forming apparatus through the first searching method and the second information array of the image forming apparatus through the second searching method. The first information array is determined if it matches the second information array. According to matching result, the discovered image forming apparatus is determined as the wireless network image forming apparatus or the wired network image forming apparatus. According to determining result, the guide icon of the driver installation of the image forming apparatus is displayed. Moreover, the wireless network image forming apparatus uses a method of connecting itself to the network through its wireless network interface. At the meantime, based on the first searching method, the wireless network image forming apparatus uses the second searching method to search and obtain more information about the image forming apparatus. By parsing information of the image forming apparatus, the wired network image forming apparatus can be distinguished from the wireless network image forming apparatus, updating the corresponding guide icons of driver installation as well as directing the wired network image forming apparatus and the wireless network image forming apparatus. This allows the user to conveniently install the driver of the image forming apparatus based on the guide icon and add the appropriate image forming apparatus, which can avoid user confusion and improve user experience.

Figure 3:
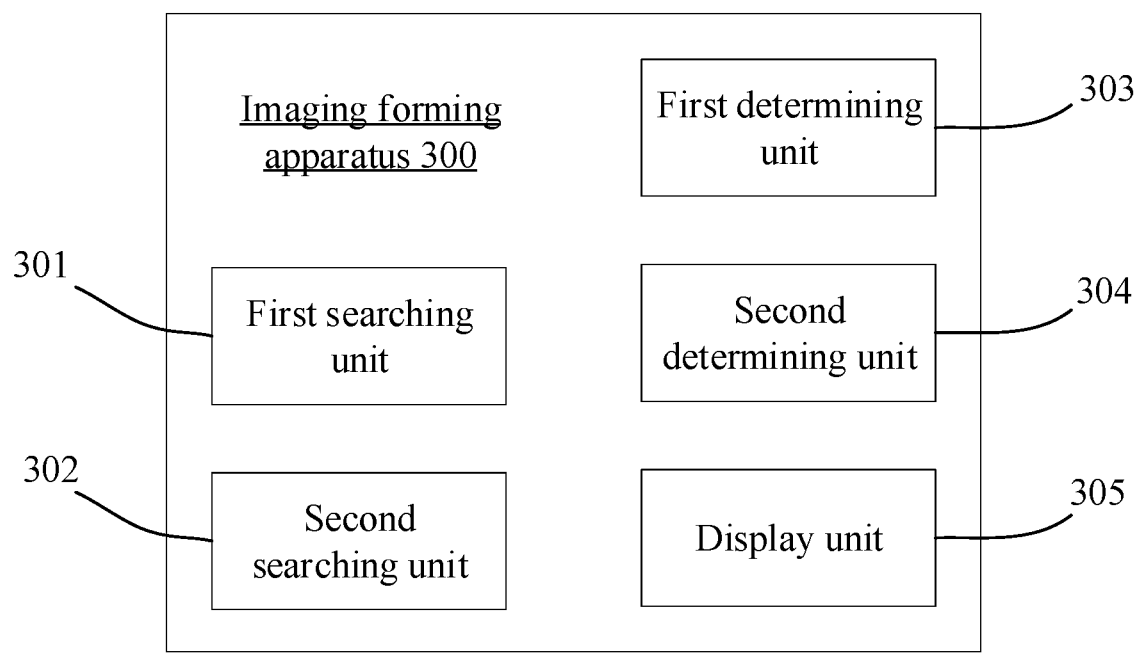
FIG. 3 depicts a schematic diagram of a searching and displaying apparatus of an image forming apparatus according to embodiments of the present disclosure.

FIG. 3 depicts a schematic diagram of the searching and displaying apparatus of the image forming apparatus according to embodiments of the present disclosure. In some embodiments, the searching and displaying apparatus 300 of the image forming apparatus includes: a first searching unit 301, configured to obtain the first information array of the image forming apparatus through the first searching method; a second searching unit 302, configured to obtain the second information array of the image forming apparatus through the second searching method; a first determining unit 303, configured to determine if the first information array matches the second information array; a second determining unit 304, configured to, according to matching result of the first determining unit 303, determine if the discovered image forming apparatus is the wireless network image forming apparatus or the wired network image forming apparatus; and a display unit 305, configured to, according to determining result of the second determining unit 304, display the guide icon of driver installation of the image forming apparatus, wherein the wireless network image forming apparatus has been connected to a network through a wireless network interface thereof.

Embodiments of the present disclosure provides the searching and displaying apparatus 300 of the image forming apparatus, involving the first information array and the second information array which includes at least one device feature information of the image forming apparatus. The device feature information includes device name, IP, UUID, hostname, MAC address, and user-defined network identifier.

Embodiments of the present disclosure provide the second determining unit 304 of the searching and displaying apparatus 300 of the image forming apparatus, configured to parse the MAC address or the user-defined network identifier. According to parsing result, the second determining unit 304 determines that the discovered image forming apparatus is the wired network image forming apparatus or the wireless image forming network apparatus. The involved display unit 305, according to determining result of the second determining unit 304, highlight-displays or gray-displays the guide icon of driver installation and directing the wired network image forming apparatus or the wireless network image forming apparatus.

Embodiments of the present disclosure provide the second determining unit 304 of the searching and displaying apparatus 300 of the image forming apparatus, also configured to parse the first information array or the second information array. According to parsing result, the discovered image forming apparatus is determined as the wired network image forming apparatus or the wireless network image forming apparatus. The display unit is further configured to a situation when according to parsing result, the second determining unit determines the discovered image forming apparatus is the wired network apparatus and the image forming apparatus has the wireless network communication interface, highlight-displaying or gray-displaying the guide icon of driver installation and directing the wireless network image forming apparatus.

Embodiments of the present disclosure provide the display unit 305 of the searching and displaying apparatus 300 of the image forming apparatus, applied in a situation when the image forming apparatus is discovered, it obtains the user operation instruction on the highlight-displayed guide icon and prompts device information of the image forming apparatus. When the image forming apparatus is discovered, the user operation instruction on the gray-displayed guide icon is obtained and prompt information is displayed to guide the user to perform the connection operation of the image forming apparatus. When multiple image forming apparatuses are discovered, the user operation instruction on the highlight-displayed guide icon is obtained, and device information of the multiple image forming apparatuses is displayed to allow the user to select an image forming apparatus based on the device information of the multiple image forming apparatuses to perform the network configuration operation and/or the driver installation operation.

Embodiments of the present disclosure provide the searching and displaying apparatus 300 of the image forming apparatus which also includes a third searching unit for searching the image forming apparatus by the third searching method. The corresponding guide icon of driver installation of the image forming apparatus displayed by the display unit 305 related to the searching and displaying apparatus 300 of the image forming apparatus described in embodiments of the present disclosure includes a driver installation method corresponding to at least one of the three connection modes of the image forming apparatus, the three connection modes including: usb connection, wired network connection, and wireless network connection. The searching and displaying apparatus 300 provided in embodiments of the present disclosure further includes a third determining unit, applied in a situation when the image forming apparatus is discovered by the third searching method, the discovered image forming apparatus is determined to belong to a same network with an image forming apparatus discovered by the first searching method or the second searching method. If they do not belong to the same network, the discovered image forming apparatus by the third searching method is executed the network configuration and/or the driver installation operation.

Embodiments of the present disclosure provide the searching and displaying apparatus 300 of the image forming apparatus which also includes an adding unit that is applied in a situation when according to the displayed guide icon of driver installation of the image forming apparatus, the user operation instruction is obtained, the driver of the image forming apparatus is installed, and the image forming apparatus is added.

The searching and displaying apparatus 300 provided in embodiments of the present disclosure obtains the first information array of the image forming apparatus by using the first searching method and the second information array of the image forming apparatus by using the second searching method. The first information array is determined if matching the second information array. According to matching result, the discovered image forming apparatus is determined as the wireless network image forming apparatus or the wired network image forming apparatus. According to determining result, the guide icon of driver installation of the image forming apparatus is displayed. Based on the first searching method, the second searching method is configured to obtain more information about the image forming apparatus. By parsing the information of the image forming apparatus, it can distinguish the wired network image forming apparatus from the wireless network image forming apparatus and update the corresponding guide icons directing the wired network image forming apparatus and the wireless network image forming apparatus. Based on the guide icons, a user can install a driver of an image forming apparatus at low cost and add an appropriate image forming apparatus without confusion, which improves user experience.

Figure 4:
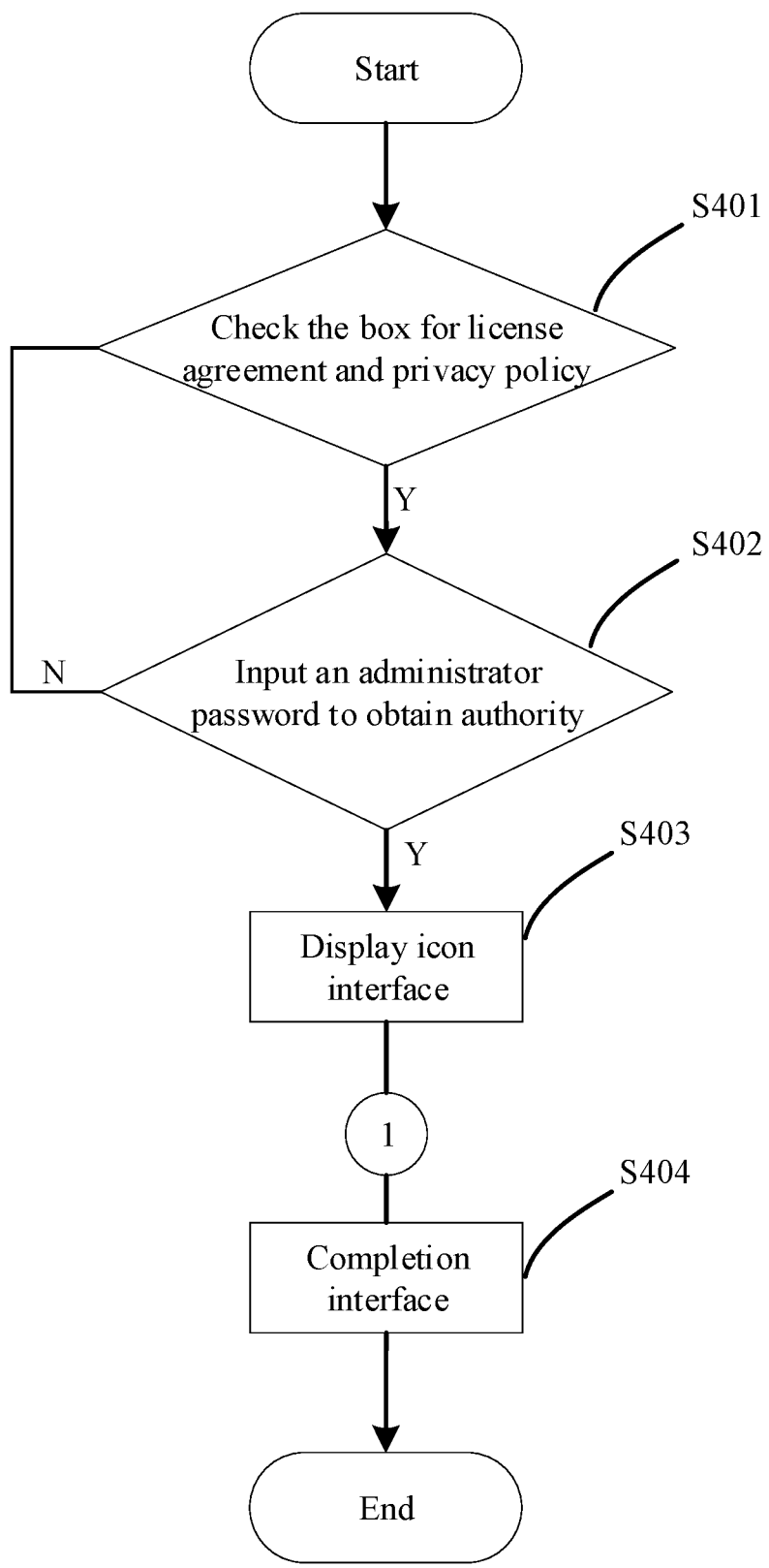
FIG. 4 depicts a process diagram of an application of a method of searching and displaying an image forming apparatus according to embodiments of the present disclosure.

FIG. 4 depicts a process diagram of a specific application of a method of searching and displaying an image forming apparatus according to embodiments of the present disclosure. In some embodiments, the searching and displaying method includes:

Step S401: Determining if the license agreement and privacy policy check boxes are selected, and/or double clicking an icon to determine if the license agreement and privacy policy are acceptable. If the box for the license agreement and privacy policy is checked, Step S402 is executed; if it is unchecked or cancelled, it returns to the initial interface or checks if exiting the current driver installation wizard.

Step S402: Determining whether to input an administrator password to obtain authority, and/or when accepting the license agreement and the privacy policy is checked, displaying an administrator authority authorization interface. It determines that if the user has input a password to obtain the root authority as the administrator or determines a password input by the user to obtain the root authority as the administrator is correct. If the input password is correct, Step S403 is executed; If the user does not enter the password and chooses to cancel, it returns to Step S401. If the user enters a wrong password, it requires re-entering the correct password.

Step S403: Displaying icon interface, and/or after obtaining an authorization, starting root authority and refreshing the display interface to display a one-click installation interface. Specifically, before the one-click installation interface is displayed or refreshed, through the Bonjour search protocol, the computer device 100 obtains device feature information of the image forming apparatus, including device name, IP, UUID, hostname, and user-defined network identifier. Through the SLP search protocol, the computer device 100 obtains device feature information such as device name, IP, UUID, hostname, MAC address, and user-defined network identifier. The device feature information discovered by the Bonjour search protocol is compared to the device feature information discovered by the SLP search protocol to determine if there are same names (for example, device name, hostname, or UUID, an identification name that can uniquely identify the image forming apparatus) or IP address. If there are same names or IP address, the device feature information such as MAC address or user-defined network identifier is parsed. By distinguishing the device feature information of the wired network device from the device feature information of the wireless network device, the discovered apparatus is determined as the wired network image forming apparatus or the wireless network image forming apparatus. The display interface is refreshed to display the corresponding guide icon of the driver installation of the wired network image forming apparatus or the wireless network image forming apparatus.

Specifically, when using the Bonjour search protocol to obtain device feature information of the image forming apparatus 200, such as the device name, IP, UUID, hostname, user-defined network identifier, etc., and using the SLP search protocol to obtain device feature information of the image forming apparatus 200, such as device name, IP, UUID, hostname, MAC address, user-defined network identifier, etc., the device feature information obtained through the two search protocols is determined if there is same device feature information (for example, hostname or IP address). If same device feature information exists, the MAC address or the user-defined network identifier of the device feature information is further parsed. If the parsing result determines that by using the two search protocols the same image forming apparatus 200 is obtained and is the wired network image forming apparatus, the corresponding guide icon of the driver installation and directing the wired network image forming apparatus is highlight-displayed. If parsing result determines that by using the two search protocols the same image forming apparatus 200 is obtained and is the wireless network image forming apparatus, the corresponding guide icon of the driver installation and directing the wireless network image forming apparatus is highlight-displayed.

Figure 5:
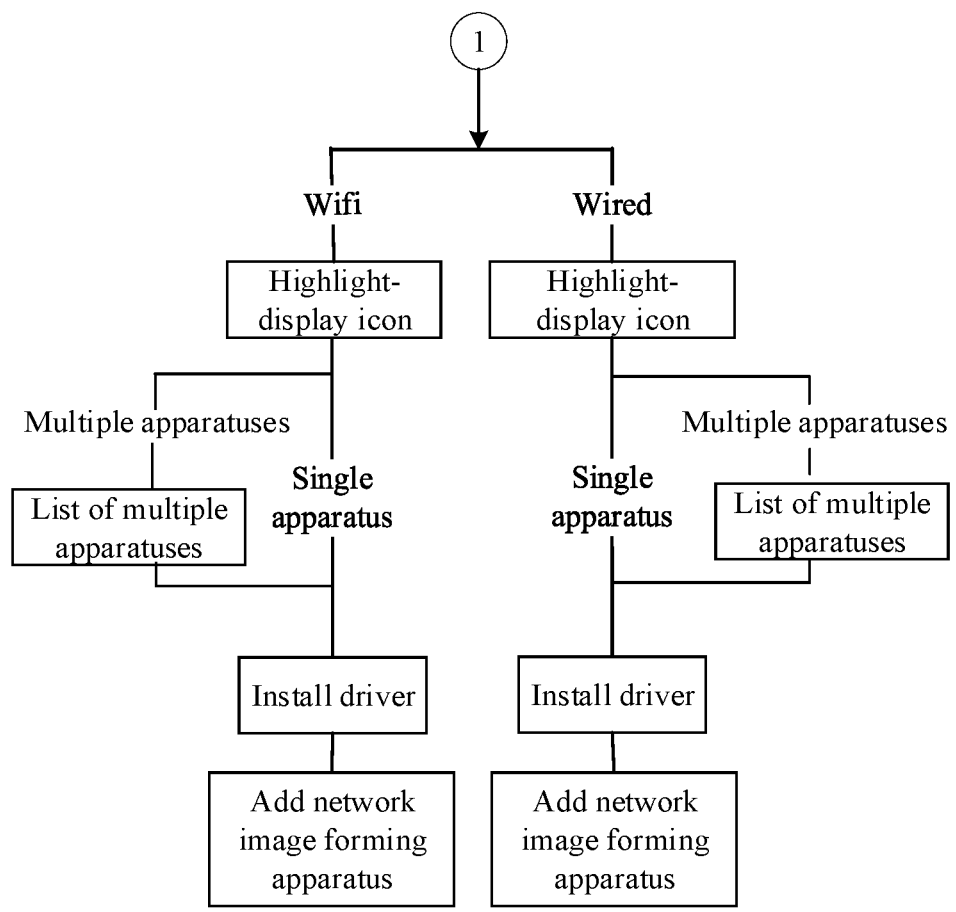
FIG. 5 depicts a process diagram of a sub-process of a method of searching and displaying an image forming apparatus according to embodiments of the present disclosure.

FIG. 5 depicts a process diagram of a sub-process of the method of searching and displaying the image forming apparatus illustrated in FIG. 4 according to embodiments of the present disclosure. When the same image forming apparatus is discovered by the two different search protocols, highlight-displaying the corresponding guide icon of the driver installation and directing the image forming apparatus is the wired network image forming apparatus includes the following two scenarios:

Scenario 1: If the same wired network image forming apparatus 200 is discovered by two different search protocols, a pointing device (such as a mouse) is placed on the guide icon directing the image forming apparatus 200 is wired network connected, displaying device feature information of the wired network image forming apparatus 200. Based on the device feature information, the user is prompted which specific image forming apparatus is the currently connected image forming apparatus. If the highlight-displayed directing icon of connecting operation of the wired network guide icon is clicked (e.g., one-click installation), the driver of the image forming apparatus 200 is installed, adding the wired network connected image forming apparatus 200 to the computer device 100.

Scenario 2: If the computer device 100 discovers multiple identical wired network image forming apparatuses 200 through the two different search protocols, the guide icon directing the multiple image forming apparatuses 200 are wired network connected is clicked to display a list of device feature information of the multiple image forming apparatuses 200; Based on the list of device feature information of the multiple image forming apparatuses 200, the user can select an image forming apparatus 200 whose driver needs to be installed and install the corresponding driver of the image forming apparatus 200.

Figure 7:
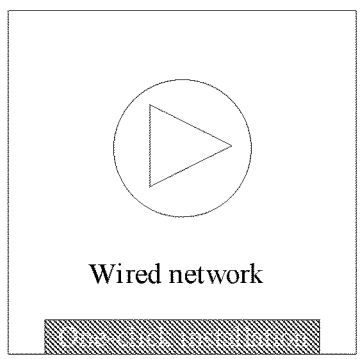
FIGS. 7A-7F depict a schematic diagram of the highlight-display/gray-display status of a guide icon under different connection modes according to embodiments of the present disclosure.
Figure 7:
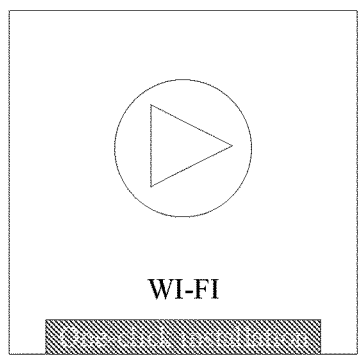
Figure 7:
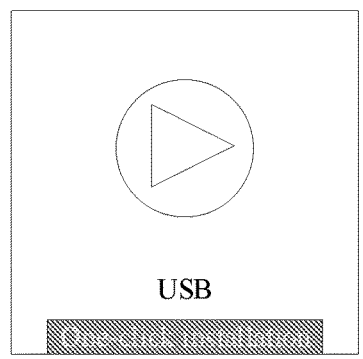
Figure 7:
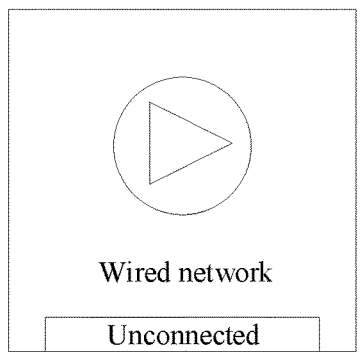
Figure 7:
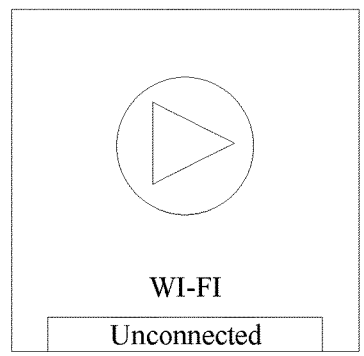
Figure 7:
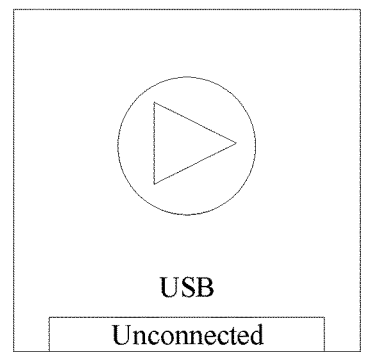

The guide icon (wired network guide icon) of the driver installation and directing the image forming apparatus 200 is the wired network image forming apparatus is shown in FIG. 7A, where the displayed guide icon of driver installation and directing the image forming apparatus 200 is the wired network apparatus includes a connection mode indication word (such as wired network), a play button, and a connection operation direction button (such as unconnected, one-click installation), etc. Exemplarily, highlight-displaying the guide icon of driver installation and directing the image forming apparatus 200 is the wired network apparatus includes an instruction button for connection operation directing the one-click installation, or the guide icon of connection operation directing the one-click installation and the corresponding one-click installation button is highlight-display (for example, with red or blue as the background color of the one-click installation button). It is understandable that in the present disclosure, except for the method of highlight-displaying the guide icon of the connection operation, directing and supporting the one-click installation include other approaches, for example, besides using different colors for directing, different directing words or different display icons, etc., are applicable, which are not specifically limited here. Similarly, except for the direct displaying the connection mode indication word (such as wired network, WiFi, etc.), the method of directing connection mode includes direct display icons, images, etc., directing the connection mode, on the interface. The illustration is only for exemplary reference, and no specific limitation is made here.

When the same wired network image forming apparatus is not discovered by the two different search protocols, the guide icon of driver installation and directing the image forming apparatus is a wired network image forming apparatus is gray-displayed, as shown in FIG. 7B. In FIG. 7B, exemplarily, gray-displaying the guide icon directing the image forming apparatus is the wired network image forming apparatus for driver installation includes the guide icon of the connection operation directing unconnected or not having a background color or having a different color/instruction from the ones supporting the one-click installation, which will not be specified here. By clicking the play button of the guide icon, a dynamic interface is popped up to prompt the user to establish the wired network connection and a schematic operation for establishing the wired network connection. Further, considering the fluctuations in the strength of the transmission signal, different search results may be obtained under different circumstances. In order to ensure the stability of the searching result of the image forming apparatus, for example, when the guide icon of driver installation and directing the image forming apparatus is the wired network image forming apparatus is gray-displayed, the instruction button of the connection operation directs unconnected, or does not have a background color, clicking the play button of the guide icon will play dynamic interface, prompting the user to establish a wired network connection and a schematic operation. At the meantime, it is possible to discover a new image forming apparatus in the current local area network and obtain a new result of searching an image forming apparatus. That is, at this time, there is an image forming apparatus connected to the local area network. The guide icon of the driver installation of the image forming apparatus changes from the status indicating unconnected to the status of one-click installation. The display status of the guide icon changes from gray-display to highlight-display and the pop-up dynamic interface is closed at the same time. Thus, the user operation can be reduced. Before the user completes the connection operation of the image forming apparatus according to the prompt information, the driver installation of the image forming apparatus can be realized. Thus, the user experience can be improved, and the comprehensiveness and accuracy of the search results of the image forming apparatus can be ensured.

Similarly, as shown in FIG. 5, when the same image forming apparatus is discovered by using the two different search protocols, highlight-displaying the corresponding guide icon of driver installation and directing the image forming apparatus is the wireless network image forming apparatus includes the following two scenarios:

Scenario 1: If the two different search protocols are configured to discover the same wireless network image forming apparatus 200, the pointing device (such as a mouse) is placed on a guide icon directing the image forming apparatus 200 is connected to Wi-Fi, and the device feature information of the Wi-Fi connected image forming apparatus 200 is displayed. Based on the device feature information, the user is prompted about the currently connected image forming apparatus is which specific image forming apparatus. If the instruction button of connection operation (such as the one-click installation) of the highlight-displayed Wi-Fi connected guide icon is clicked, the driver of the image forming apparatus 200 is installed. The wired network connected image forming apparatus 200 is added to computer device 100.

Scenario 2: If the computer device 100 discovers multiple identical Wi-Fi connected image forming apparatuses 200 through the two different search protocols, the guide icon directing the image forming apparatuses 200 are Wi-Fi connected is clicked to display a list of device feature information of the multiple image forming apparatuses 200. Based on the list of device feature information of the multiple image forming apparatuses 200, the user can select the image forming apparatus 200 and add the corresponding driver of the image forming apparatus 200.

The guide icon (Wi-Fi connection guide icon) of driver installation and directing the image forming apparatus 200 is Wi-Fi connected image forming apparatus is shown in FIG. 7C. The displayed guide icon of driver installation and directing the image forming apparatus 200 is the Wi-Fi connected image forming apparatus includes connection mode indication words (such as wired network), play button, and connection operation indication button (such as unconnected, one-click installation), etc. For example, highlight-displaying the guide icon of driver installation and directing the image forming apparatus 200 is the Wi-Fi connected image forming apparatus includes the instruction button of connection operation directing the one-click installation, or the instruction button of connection operation directing the one-click installation as well as highlight-displaying the corresponding one-click installation button (includes using red, blue, or other colors as a background color of the one-click installation button). Understandably, the supporting and directing the one-click installation here, besides the method of highlight-displaying the connection operation indication button, can also be other methods, for example, in addition to using different colors for directing, different indication words or different display icons are also applicable, which are not specifically limited here. Similarly, the method of directing the connection method includes directly displaying the connection mode indication words (such as wired network, WiFi, etc.), directly displaying icons, images, etc. directing the connection mode on the interface. The figure is only shown as an exemplary reference and is not specifically limited here.

When a same Wi-Fi-connected image forming apparatus is not discovered by using the two different search protocols, the guide icon of driver installation and directing the image forming apparatus is a Wi-Fi connected image forming apparatus is gray-displayed, as shown in FIG. 7D. In FIG. 7D, for example, gray-displaying the guide icon of driver installation and directing the image forming apparatus is the Wi-Fi connected image forming apparatus includes the instruction button of connection operation directing unconnected, or displaying no background color, or displaying colors or instruction information different from supporting the one-click installation, which is not specifically limited here. Clicking the play button in the guide icon will pop up a dynamic interface to prompt a user to establish a wired network connection and a schematic operation for establishing the wired network connection. Further, considering the fluctuations in the strength of the transmission signal, different search results may be obtained under different circumstances. In order to ensure the stability of the result of searching an image forming apparatus, for example, when the guide icon of driver installation and directing the image forming apparatus is a wired network image forming apparatus is gray-displayed, the instruction button of the connection operation directs unconnected, or does not have a background color, clicking a play button of the guide icon will play dynamic interface and prompt the user to establish a wired network connection and a schematic operation. In the meantime, it is possible to discover a new image forming apparatus in the current local area network and obtain a new result of searching an image forming apparatus. That is, at this time, there is an image forming apparatus connected to the local area network. The guide icon of the driver installation of the image forming apparatus changes from a status indicating unconnected to a status of one-click installation. The display status of the guide icon changes from gray-display to highlight-display and the pop-up dynamic interface is closed at the same time. In this way, user operations can be reduced. Before the user completes the connection operation of the image forming apparatus, according to the prompt information, the driver installation of the image forming apparatus can be realized. Thus, the user experience is improved, and the comprehensiveness and accuracy of the search results of the image forming apparatus are ensured.

Step S404: displaying an interface showing driver installation of the image forming apparatus 200 is completed.

The method of searching and displaying the image forming apparatus described in embodiments of the present disclosure discovers a same image forming apparatus by different methods to determine the existence of the image forming apparatus. In the meantime, by parsing device feature information (such as MAC address or user-defined network identifier) of the image forming apparatus searched and discovered by the different search methods, the method of highlight-displaying the corresponding guide icon directing the image forming apparatus is the wired network image forming apparatus or the wireless network image forming apparatus can ensure that the search results of the image forming apparatus are accurate and stable. On the other hand, the method is easy to distinguish a wired network image forming apparatus from a wireless network image forming apparatus, highlight-displaying the guide icon of driver installation of the corresponding image forming apparatus. The method simplifies the operation of installing the driver of the image forming apparatus and improves the user experience.

Figure 6:
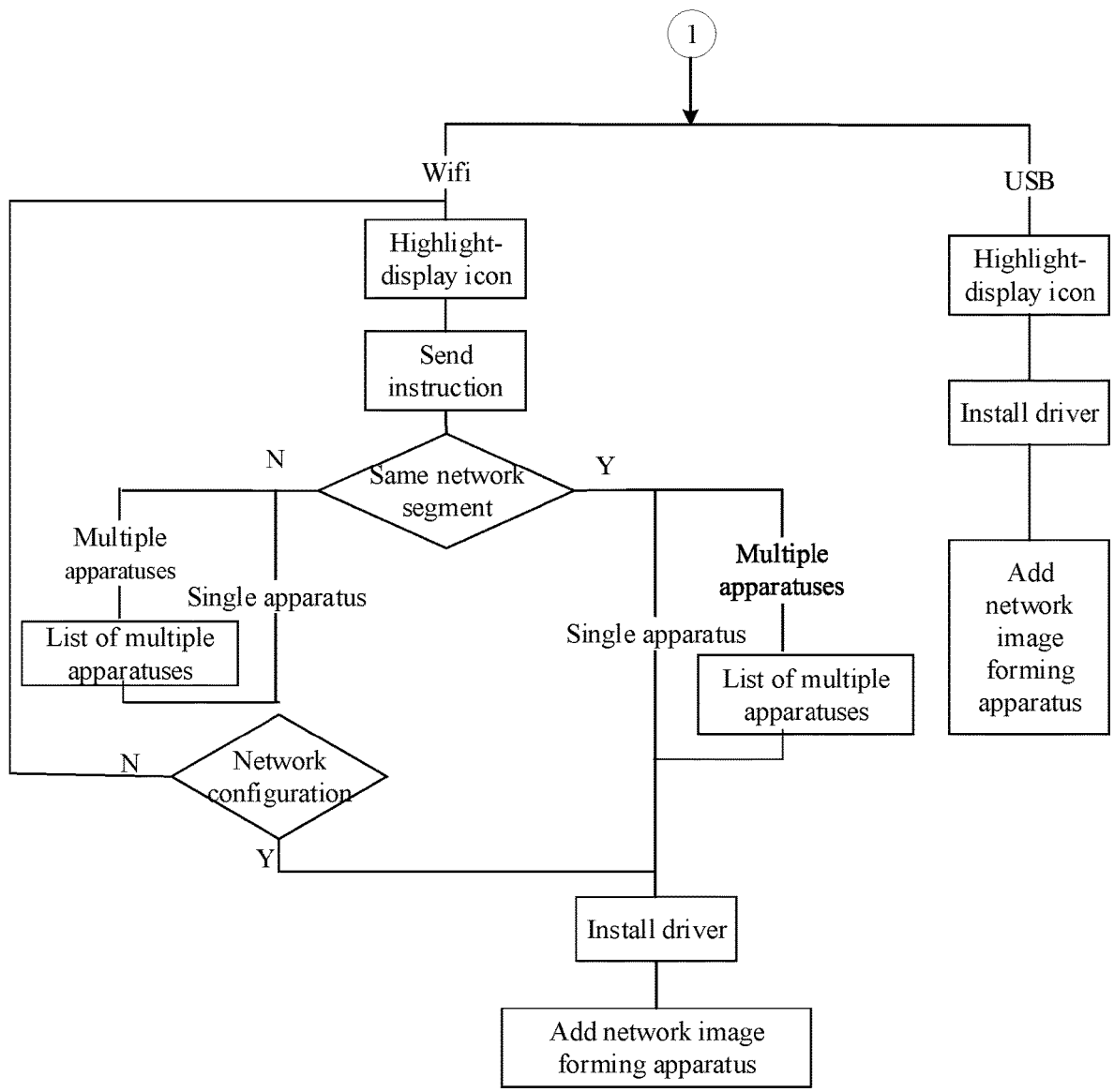
FIG. 6 depicts a process diagram of another sub-process of a method of searching and displaying an image forming apparatus according to embodiments of the present disclosure.

FIG. 6 depicts a process diagram of another sub-process of the method of searching and displaying the image forming apparatus described in FIG. 4 according to embodiments of the present disclosure. The sub-flow includes: through a USB communication interface, searching for an image forming apparatus to obtain device feature information of the image forming apparatus, such as hostname, IP address, etc. If a USB connection is established between the computer device 100 and the image forming apparatus 200, when the computer device 100 discovers the image forming apparatus 200, the guide icon directing the image forming apparatus 200 is USB-connected is highlight-displayed, as shown in FIG. 7E. When the computer device 100 discovers the image forming apparatus 200 through the USB communication interface, the pointing device (such as a mouse) is placed on the guide icon directing the image forming apparatus 200 is USB-connected, displaying device feature information of the USB-connected image forming apparatus 200. Based on the device feature information, the user is prompted that which specific image forming apparatus is the currently connected image forming apparatus. If clicking an instruction button of connection operation (for example, one-click installation) of a highlight-displayed guide icon directing the image forming apparatus is USB-connected, the driver of the corresponding image forming apparatus 200 is installed and the USB-connected image forming apparatus 200 is added to the computer device 100. If the computer device 100 discovers multiple image forming apparatuses 200 via USB, the guide icon directing the image forming apparatuses 200 are USB-connected is clicked to display a list of device feature information of the multiple image forming apparatuses 200 connected to the computer device 100 by USB. Based on the list of device feature information of the multiple image forming apparatuses 200, the user can select an image forming apparatus 200 that needs to install a driver of the image forming apparatus, installing the driver of the corresponding image forming apparatus, and adding the selected USB-connected image forming apparatus 200 to the computer device 100. In FIG. 7E, the guide icon directing an image forming apparatus 200 is USB-connected includes the connection mode indication words (such as USB), a play button, and an instruction button of connection operation (such as unconnected and one-click installation), etc. For example, highlight-displaying the guide icon directing the image forming apparatus 200 is USB-connected includes the instruction button of connection operation directing one-click installation, the instruction button of connection operation directing one-click installation as well as highlight-displaying the corresponding one-click installation button (such as using red or blue as the background color of the one-click installation button).

If no USB connection is established between the computer device 100 and the USB-connected image forming apparatus 200, the guide icon directing the image forming apparatus 200 is USB-connected is gray-displayed, as shown in FIG. 7F. In FIG. 7F, for example, gray-displaying the guide icon directing the image forming apparatus 200 is USB-connected includes an instruction button of connection operation directing not being connected or having no background color. Clicking the play button of the guide icon pops up a dynamic interface to prompt the user to establish a USB connection to the image forming apparatus and a schematic operation of establishing the USB connection.

In the method of searching and displaying the image forming apparatus provided by embodiments of the present disclosure, when the USB interface discovers a USB-connected image forming apparatus 200, by corresponding instruction, the image forming apparatus 200 is discovered as well as the discovered image forming apparatus 200 is a USB-connected image forming apparatus with its guide icon of driver installation is highlight-displayed, the user can easily determine which type of image forming apparatus is the image forming apparatus 200. Through the highlight-displayed guide icon, the driver of the corresponding image forming apparatus 200 is one-click installed, simplifying the operation and improving the user experience.

In addition, as shown in FIG. 6, under the situation that the computer device 100 and the image forming apparatus 200 are connected by a USB communication, when same multiple image forming apparatuses are discovered by using the two different search protocols (Bonjour search protocol and SLP search protocol), the corresponding guide icon of driver installation and directing the image forming apparatus 200 is a wireless network (Wi-Fi connection) image forming apparatus is highlight-displayed. Then, the highlight-displayed guide icon is clicked to send an instruction to search and obtain device feature information of the USB-connected image forming apparatus 200, such as device name, serial number, hostname, or IP address, etc. Based on the device feature information of the discovered USB-connected image forming apparatus and the device feature information of the image forming apparatus 200 discovered by the two different search protocols, the image forming apparatus 200 discovered by USB-searching and the image forming apparatus 200 discovered by wireless network search are determined if belong to a same network segment. If they belong to the same network segment, a list of device feature information of multiple image forming apparatuses 200 is displayed. If they do not belong to the same network segment, the displayed list of the device feature information of multiple image forming apparatuses 200 includes the image forming apparatus 200 discovered through the USB communication interface and waiting for completing the network configuration as well as the multiple image forming apparatuses 200 searched and discovered by the two different search protocols. Understandably, by comparing the device feature information of the image forming apparatus 200 discovered through USB-searching, including the hostname or IP address, to the device feature information of the image forming apparatus 200 discovered through wireless network searching, the image forming apparatus 200 discovered through USB-searching and the image forming apparatus 200 discovered through wireless network searching are determined if they belong to the same network segment. If they belong to the same network segment, when only one image forming apparatus 200 is discovered, a corresponding instruction button (such as one-click installation) of connection operation of the guide icon of driver installation is clicked to install the driver of the corresponding image forming apparatus 200, adding the USB-connected image forming apparatus 200 to the computer device 100; If multiple image forming apparatuses 200 are discovered, the corresponding guide icon of driver installation is clicked to display a list of the device feature information of the multiple image forming apparatuses 200. Based on the list of the device feature information of the multiple image forming apparatuses 200, the user can select the image forming apparatus 200 that needs to install a driver of image forming apparatus, installing the driver of the corresponding image forming apparatus 200; If they do not belong to the same network segment, when only one USB-connected image forming apparatus that has not completed the network configuration is discovered, by clicking and selecting through USB, the image forming apparatus 200 is used the Wi-Fi and installed. The image forming apparatus 200 is selected to perform a network configuration operation. After completing the network configuration, the driver of the corresponding image forming apparatus 200 is further installed, adding the corresponding image forming apparatus 200 to the computer device 100. If multiple USB-connected image forming apparatuses 200 are discovered and have not completed network configuration, the corresponding guide icon of driver installation is clicked to display a list of device feature information of corresponding multiple image forming apparatuses, from which USB is selected to configure Wi-Fi to the image forming apparatus 200 and install it. In the meantime, from the list of device feature information of the image forming apparatus 200, the image forming apparatus 200 waiting to be performed network configuration and driver installation is selected to complete the network configuration. After the network configuration is completed, a one-click installation operation is further performed to install the driver of the corresponding image forming apparatus 200 and add the corresponding image forming apparatus 200 to the computer device 100. Optionally, if the image forming apparatus 200 discovered through the USB-searching is determined to belong to a different network segment as the image forming apparatus 200 discovered through the wireless network search, when a USB-connected image forming apparatus 200 that has not completed the network configuration is discovered, specifically, through the device feature information of the USB-search discovered image forming apparatus 200, the image forming apparatus 200 is determined if has the wireless network connection function. If there is a wireless network connection function, a network configuration operation is further performed. After completing the network configuration, the driver corresponding to the image forming apparatus 200 is installed through further implementing the one-click installation operation, adding the corresponding image forming apparatus 200 to the computer device 100.

In the method of searching and displaying the image forming apparatus provided by embodiments of the present disclosure, when an image forming apparatus is discovered through the two different search protocols and an image forming apparatus is discovered through the USB interface searching and the image forming apparatus discovered by the USB-searching does not belong to the same network segment as the image forming apparatus discovered by the two different search protocols, the guide icon of driver installation and directing the image forming apparatus is the wireless network image forming apparatus is highlight-displayed. On the one hand, through highlight-displaying the guide icon, the user can easily know that an image forming apparatus has been discovered, and the user can know which connection type of an image forming apparatus the discovered image forming apparatus belongs to, by further clicking the highlight-displayed guide icon; On the other hand, even if the image forming apparatus discovered by the USB-searching belongs to different network segments, the network configuration can also be completed through the one-click network configuration operation, making the image forming apparatus discovered by the USB-searching connect to the same network as the image forming apparatus discovered through the two different search protocols and implement a one-click installation of the driver, which simplifies the user operation and improves the user experience.

Embodiments of the present disclosure provide another method of searching and displaying an image forming apparatus, including using the Bonjour search protocol to obtain device feature information of an image forming apparatus 200, such as device name, IP, UUID, hostname, and user-defined network identifier, etc., and using the SLP search protocol to obtain device feature information of an image forming apparatus 200, such as device name, IP, UUID, hostname, MAC address, user-defined network identifier, etc. When same device feature information of the image forming apparatus 200 is obtained through the two search protocols, such as the hostname or IP address, it is determined that a same image forming apparatus 200 is discovered. By further parsing the device feature information of the same image forming apparatus 200, such as MAC address or user-defined network identifier, the same image forming apparatus 200 is determined as the wired network image forming apparatus 200. Meanwhile, by parsing other device feature information of the same image forming apparatus 200, such as device name, IP, UUID, hostname, user-defined network identifier, etc., when the same image forming apparatus 200 is determined to have a wireless communication interface, the guide icon of driver installation and directing the image forming apparatus 200 is a wireless network image forming apparatus is highlight-displayed. After clicking the highlight-displayed guide icon, if the same image forming apparatus 200 is a single unit, the user is prompted to perform a network configuration operation. After completing the network configuration operation, the driver installation of the same image forming apparatus 200 is executed by the one-click installation to add the image forming apparatus 200 to the computer device 100; If there are multiple identical image forming apparatuses, a list of device feature information of the multiple identical image forming apparatuses 200 is displayed. The user can select an image forming apparatus 200 from the list for implementing the driver installation operation, further executing the network configuration operation. After the network configuration is completed, by clicking the instruction button of connection operation (such as one-click installation) of the guide icon, one-click installation is implemented to complete the driver installation operation of the same image forming apparatus 200, adding the image forming apparatus 200 to the computer device 100.

In the method of searching and displaying the image forming apparatus provided in embodiments of the present disclosure, when a same image forming apparatus is discovered through two different search protocols as well as through parsing the device feature information obtained from corresponding searching, the discovered image forming apparatus is determined as the wired network image forming apparatus. In the meantime, when determining the image forming apparatus have the wireless network connection function through parsing the device feature information, the guide icon of driver installation and directing the image forming apparatus is the wireless network image forming apparatus is highlight-displayed. On the one hand, through highlighting the guide icon, the user can easily know that an image forming apparatus has been discovered. Moreover, the user can further know which connection type of an image forming apparatus the discovered image forming apparatus belongs to, by clicking the highlight-displayed guide icon; On the other hand, the network configuration can be completed through the one-click network configuration operation, adding the image forming apparatus to the wireless network, and executing the one-click driver installation. The searching and displaying method simplifies user operation and improves user experience.

Next, the present disclosure will further describe when the image forming apparatus 200 discovered by the computer device 100 does not share a same network segment, the network configuration process steps include the following two scenarios:

Scenario 1: the computer device 100 is connected to the wired network, and the user is prompted that he/she needs to, based on the wired network information connected to the computer device 100, enter the SSID (Service Set Identifier) and password to the same network, performing the WiFi configuration. The display interface is shown in FIG. 7A.

Figure 8B:
FIG. 8B depicts a schematic diagram of a displayed interface for accessing a keychain key according to embodiments of the present disclosure.

Scenario 2: the computer device 100 is connected to a wireless network, and a pop-up window prompts a user that the one-click installation needs to access the SSID and password to the same network segment where the computer device 100 is connected to or has been connected to, as shown in FIG. 7B. If the user chooses to allow or always allow access, the SSID and password obtained during the access is configured to perform the WiFi configuration. If the access is denied, a display interface is switched that requires the user to manually input the SSID and password, as shown in FIG. 8A. It should be noted that, for different image forming apparatuses, the display content of the corresponding interface is different. The display interface here is only for reference, not for specific limitation. For example, for an image forming apparatus that supports different encryption methods (such as WPA3), the "encryption method" check box and/or the "encryption method" field are not displayed. As shown in FIG. 8B, a user can, based on the illustrated display interface, select whether to allow access to the keys in the keychain. After allowing access to the keychain or verifying the manually entered SSID and password, the corresponding parameters (SSID and password) will be sent to the image forming apparatus 200 to feed back the result of successful network configuration. The device feature information of the image forming apparatus 200, such as a hostname and an IP address, is obtained and compared to the device feature information in WiFi. If there is same device feature information, such as a hostname and an IP address, the discovery of the image forming apparatus 200 is confirmed. It should be noted that the above display interface is only for reference and is not specifically limited here.

Embodiments of the present disclosure describe that when the image forming apparatus 200, discovered by the computer device 100, does not share a same network segment, compared to using the installation package of pkg package which is a method of using the installation package of pkg package to guide a user to perform network configuration step-by-step and adding the image forming apparatus 200, the executing network configuration process simplifies the operation and improves the user experience. In the method presented in this application, after the WI-FI one-click installation button is highlight-displayed, if the user has connected to WI-FI, simply allowing the installation tool to access the keychain in the pop-up window to complete the network configuration, install the driver of the image forming apparatus 200, and execute the operation of adding the image forming apparatus 200. If WI-FI is not connected, the user is prompted to enter the SSID and password can complete the network configuration.

In the method of searching and displaying an image forming apparatus provided in embodiments of the present disclosure, a same image forming device is discovered by different search methods to determine the existence of the image forming apparatus. In the meantime, by parsing the device feature information (such as MAC address or user-defined network identifier) of the image forming apparatuses obtained by different search methods, the corresponding guide icon directing the image forming apparatus is the wired network image forming apparatus or the wireless network image forming apparatus is highlight-displayed. On the one hand, it can ensure that the search results of the image forming apparatus are accurate and stable. On the other hand, it is easy to distinguish the wired network image forming apparatus from the wireless network image forming apparatus. The corresponding guide icon of driver installation of the image forming apparatus is highlight-displayed, which simplifies the user operation of driver installation of the image forming apparatus and improves user experience. Moreover, through the USB communication interface, the image forming apparatus 200 is discovered. When the image forming apparatus 200 discovered by two different search protocols does not belong to the same network segment as the image forming apparatus 200 discovered by the USB communication interface, the image forming apparatus 200 discovered through USB communication interface is executed the network configuration. After completing the network configuration, the corresponding driver of an image forming apparatus 200 is further installed by the one-click installation.

In a practical realization, the driver installation manner of the image forming apparatus 200 described in the present disclosure also includes other applicable installation manners, which are not specifically limited here. For example, the driver of the image forming apparatus 200 is installed via USB/network or the hostname or IP address of the image forming apparatus, by using SNMP (Simple Network Management Protocol) to discover the image forming apparatus 200 and install a confirmed program of the image forming apparatus 200, adding the USB/network image forming apparatus 200.

In a practical realization, embodiments of the present disclosure also provide an electronic device. The electronic device includes one or more processors, memory, and one or more computer programs. The one or more computer programs are stored in the memory. The one or more computer programs include instructions. When the instructions are executed by the electronic device, the electronic device performs some or all of the steps in above embodiments.

In a practical realization, the present disclosure also provides a computer storage medium, in which the computer storage medium stores a program. The execution of the program includes part or all of the steps described in embodiments of the present disclosure. The computer storage medium includes a magnetic disk, an optical disk, a ROM (read-only memory), or a RAM (random access memory), etc.

In a practical realization, embodiments of the present disclosure also provide a computer program product. The computer program product includes executable instructions. When the executable instructions are executed on a computer, the computer executes part or all of the steps in above embodiments.

In some embodiments, the first information array of the image forming apparatus is obtained through the first searching method; The second information array of the image forming apparatus is obtained through the second searching method; The first information array is determined if it matches the second information array; According to matching result, the discovered image forming apparatus is determined to be the wireless network image forming apparatus or the wired network image forming apparatus. According to the determining result, the guide icon of driver installation of the image forming apparatus is displayed. Therefore, based on the first searching method, the second searching method is configured to search and obtain more information of the image forming apparatus and further distinguish the wired network image forming apparatus from the wireless network image forming apparatus, directing a user to install the driver of the image forming apparatus easily for adding an appropriate image forming apparatus, which avoids user confusion and improves user experience.

In the embodiments of the present disclosure, "at least one" means one or more, and "multiple" means two or more. "And/or" describes the relationship of associated subjects, indicating the existence of three kinds of relationships. For example, A and/or B indicate that A exists alone, A and B exist simultaneously, or B exists alone. Among them, A and B can be singular or plural. The character "/" generally indicates that the contextual subjects are an "or" relationship. "At least one of the following" and similar expressions refer to any combination of these items, including any combination of single items or plural items. For example, at least one of a, b, and c can represent: a, b, c, a-b, a-c, b-c, or a-b-c, where a, b, c can be single or multiple items.

Those persons of ordinary skill in the art can appreciate that each unit and algorithm step described in the embodiments disclosed herein can be realized by a combination of electronic hardware, computer software, and electronic hardware. Whether these functions are executed by hardware or software depends on the specific application and design constraints of the technical solution. Those persons of ordinary skill in the art may use different methods to implement the described functions for each specific application, but such implementation should not be regarded as exceeding the scope of the present invention.

Those persons of ordinary skill in the art can clearly understand that for the convenience and brevity of the description, the specific working process of the above-described system, device, and unit can refer to the corresponding process in the foregoing embodiment, which will not be repeated here.

In several embodiments of the present disclosure, if any function is realized in the form of a software function unit and sold or used as an independent product, it can be stored in a computer-readable storage medium. Based on this understanding, the essence of the technical solution of the present disclosure, the part that contributes to the prior art, or the part of the technical solution that can be embodied in the form of a software product. The computer software product is stored in a storage medium, including several instructions are configured to make a computer device (may be a personal computer, a server, or a network device, etc.) execute all or part of the steps of the methods described in embodiments of the present disclosure. The aforementioned storage medium includes U disk, mobile hard disk, read-only memory (ROM), random access memory (RAM), magnetic disk or optical disk, etc., which can store program codes.

The above is only a specific implementation of the present invention, and any persons of ordinary skill in the art can easily conceive modifications or substitutions within the technical scope disclosed in the present disclosure, which should be covered by the protection scope of the present disclosure. The protection scope of the present invention shall be determined by the protection scope of the claims.

What is claimed is:

1. A method of searching and displaying an image forming apparatus, comprising:
    discovering an image forming apparatuses for resource controlling by performing the steps of:
        obtaining a first device feature information of image forming apparatus through a first searching method;
        obtaining a second device feature information of image forming apparatus through a second searching method, wherein the second search method is a different searching algorithm from the first method and the first and second device feature information is at least one of: device name, IP, UUID, hostname, MAC address and user defined network identifier;
        discovering a first image forming apparatus by determining that the first device feature information matches the second device feature information;
        discovering an additional image forming apparatus by performing a third searching method having a different searching algorithm from the first and second methods;
        determining that the additional image forming apparatus discovered through the third searching method and the first image forming apparatus discovered according to the matching result do not belong to the same network;
        based on the discovery, ascertaining the network configuration associated with the first image forming apparatus and the additional image forming apparatus, wherein the first image forming apparatus is determined to be wireless based on the first image forming apparatus being connected to a network through a wireless network interface and the additional image forming apparatus is of a different type;
        based on the network configuration of the first and additional image forming apparatuses, dynamically altering the appearance and performance of an associated guide icon for driver installation for each image forming apparatus, wherein the guide icon of the driver installation of the first image forming apparatus includes a driver installation mode configured to the connection mode corresponding to the network configuration of the first image forming apparatus and the guide icon is configurable to a USB connection configuration protocol, a wired network connection configuration protocol, and a wireless network connection configuration protocol; and
        invoking the guide icon for the first and additional image forming apparatuses, wherein the invocation performs the steps of executing on the discovered image forming apparatus a network configuration operation and/or a driver installation operation associated with first and additional image forming apparatuses.

2. The method according to claim 1, wherein ascertaining the network configuration associated with the first image forming apparatus and the additional forming apparatus and dynamically altering the appearance and performance of an associated guide icon for driver installation for each image forming apparatus further comprise:
    parsing the first device feature information or the second device feature information and, according to parsing result, determining the first image forming apparatus is a wireless network image forming apparatus or a wired network image forming apparatus; and
    according to determining result, directing the guide icon for driver installation of the wireless network image forming apparatus or the wired network image forming apparatus to be highlight-displayed or gray-displayed.

3. The method according to claim 2, wherein, after directing the guide icon of the driver installation of the wireless network image forming apparatus or the wired network image forming apparatus to be highlight-displayed or gray-displayed, the method comprises:
    when one image forming apparatus is discovered, obtaining user operation instruction from the highlight-displayed guide icon and prompting device information of the image forming apparatus;
    when one image forming apparatus is discovered, obtaining user operation instruction from the gray-displayed guide icon and displaying prompt information to guide a user to perform a connection operation of the image forming apparatus; and
    when multiple image forming apparatuses are discovered, obtaining user operation instruction from the highlight-displayed guide icon and displaying device information of the multiple image forming apparatuses to direct the user to select an image forming apparatus to perform a network configuration operation and/or a driver installation operation based on the device information of the multiple image forming apparatuses.

4. The method according to claim 1, wherein ascertaining the network configuration associated with the first image forming apparatus and the additional forming apparatus and dynamically altering the appearance and performance of an associated guide icon for driver installation for each image forming apparatus further comprise:
parsing the first device feature information or the second device feature information and, according to parsing result, determining the first image forming apparatus is a wireless network image forming apparatus or a wired network image forming apparatus; and
when according to parsing result, the first image forming apparatus is determined to be the wired network image forming apparatus and the first image forming apparatus has a wireless network communication interface, directing the guide icon of the driver installation of the wireless network image forming apparatus to be highlight-displayed or gray-displayed.

5. The method according to claim 4, wherein, after directing the guide icon of the driver installation of the wireless network image forming apparatus to be highlight-displayed or gray-displayed, the method comprises:
when one image forming apparatus is discovered, obtaining user operation instruction from the highlight-displayed guide icon and prompting device information of the image forming apparatus;
when one image forming apparatus is discovered, obtaining user operation instruction from the gray-displayed guide icon and displaying prompt information to guide a user to perform a connection operation of the image forming apparatus; and
when multiple image forming apparatuses are discovered, obtaining user operation instruction from the highlight-displayed guide icon and displaying device information of the multiple image forming apparatuses to allow the user to select an image forming apparatus to perform a network configuration operation and/or a driver installation operation based on the device information of the multiple image forming apparatuses.

6. The method according to claim 1, further comprising: according to a display status of the guide icon of the driver installation of the image forming apparatus, obtaining a user operation instruction, installing a driver of the image forming apparatus, and adding the image forming apparatus.

7. An electronic apparatus, comprising:
a memory containing a computer program for performing a method of searching and displaying an image forming apparatus; and
a processor coupled to the memory and, when the computer program is being executed, configured to:
discover an image forming apparatus for resource controlling by performing the steps of:
obtain a first device feature information of image forming apparatus through a first searching method;
obtain a second device feature information of image forming apparatus through a second searching method, wherein the second search method is a different searching algorithm from the first method and the first and second device feature information is at least one of: device name, IP, UUID, hostname, MAC address and user defined network identifier;
discover a first image forming apparatus by determining that the first device feature information matches the second device feature information;
discover an additional image forming apparatus by performing a third searching method having a different searching algorithm form the first and second methods;
determin that the additional image forming apparatus discovered through the third searching method and the first image forming apparatus discovered according to the matching result do not belong to the same network;
based on the discovery, ascertaining the network configuration associated with the first image forming apparatus and the additional image forming apparatus, wherein the first image forming apparatus is determined to be wireless based on the first image forming apparatus being connected to a network though a wireless network interface and the additional image forming apparatus is of a different type;
based on the network configuration of the first and additional image forming apparatus, dynamically altering the appearance and performance of an associated guide icon for driver installation for each image forming apparatus wherein the guide icon of the driver installation of the first image forming apparatus includes a driver installation mode configured to the connection mode corresponding to the network configuration of the first image forming apparatus and the guide icon is configurable to a USB connection configuration protocol, a wired network connection configuration protocol, and a wireless network connection configuration protocol; and
invoke the guide icon for the first and additional image forming apparatuses, wherein the invocation performs the steps of executing on the discovered image forming apparatus a network configuration operation and/or a driver installation operation associated with first and additional image forming apparatuses.

8. The electronic apparatus according to claim 7, wherein the processor is further configured to:
parse the first device feature information or the second device feature information and, according to parsing result, determine the first image forming apparatus is a wireless network image forming apparatus or a wired network image forming apparatus; and
according to determining result, direct the guide icon for driver installation of the wireless network image forming apparatus or the wired network image forming apparatus to be highlight-displayed or gray-displayed.

9. The electronic apparatus according to claim 8, wherein the processor is further configured to:
when one image forming apparatus is discovered, obtain user operation instruction from the highlight-displayed guide icon and prompting device information of the image forming apparatus;
when one image forming apparatus is discovered, obtain user operation instruction from the gray-displayed guide icon and displaying prompt information to guide a user to perform a connection operation of the image forming apparatus; and
when multiple image forming apparatuses are discovered, obtain user operation instruction from the highlight-displayed guide icon and displaying device information of the multiple image forming apparatuses to direct the user to select an image forming apparatus to perform a network configuration operation and/or a driver installation operation based on the device information of the multiple image forming apparatuses.

10. The electronic apparatus according to claim 7, wherein the processor is further configured to:
parse the first device feature information or the second device feature information array and, according to parsing result, determine the first image forming apparatus is a wireless network image forming apparatus or a wired network image forming apparatus; and
when according to parsing result, the first image forming apparatus is determined to be the wired network image forming apparatus and the first image forming apparatus has a wireless network communication interface, direct the guide icon of the driver installation of the wireless network image forming apparatus to be highlight-displayed or gray-displayed.

11. The electronic apparatus according to claim 10, wherein the processor is further configured to:
when one image forming apparatus is discovered, obtain user operation instruction from the highlight-displayed guide icon and prompting device information of the image forming apparatus;
when one image forming apparatus is discovered, obtain user operation instruction from the gray-displayed guide icon and displaying prompt information to guide a user to perform a connection operation of the image forming apparatus; and
when multiple image forming apparatuses are discovered, obtain user operation instruction from the highlight-displayed guide icon and displaying device information of the multiple image forming apparatuses to allow the user to select an image forming apparatus to perform a network configuration operation and/or a driver installation operation based on the device information of the multiple image forming apparatuses.

12. The electronic apparatus according to claim 7, further comprising:
according to a display status of the guide icon of the driver installation of the image forming apparatus, obtaining a user operation instruction, installing a driver of the image forming apparatus, and adding the image forming apparatus.

13. A non-transitory computer-readable storage medium, comprising a stored program, wherein when being executed, the stored program causes a computer to perform a method of searching and displaying an image forming apparatus, the method comprising:
discovering an image forming apparatus for resource controlling by performing the steps of:
obtaining a first device feature information of image forming apparatus through a first searching method;
obtaining a second device feature information of image forming apparatus through a second searching method, wherein the second search method is a different searching algorithm form the first method and the first and second device feature information is at least one of: device name, IP, UUID, hostname, MAC address and user defined network identifier;
discovering a first image forming apparatus by determining that the first device feature information matches the second device feature information;
discovering an additional image forming apparatus by performing a third searching method having a different searching algorithm from the first and second methods;
determining that the additional image forming apparatus discovered through the third searching method and the first image forming apparatus discovered according to the matching result do not belong to the same network;
based on the discovery, ascertaining the network configuration associated with the first image forming apparatus and the additional image forming apparatus, wherein the first image forming apparatus is determined to be wireless based on the first image forming apparatus being connected to a network though a wireless network interface and the additional image forming apparatus is of a different type;
based on the network configuration of the first and additional image forming apparatus, dynamically altering the appearance and performance of an associated guide icon for driver installation for each image image forming apparatus,
wherein the guide icon of the driver installation of the first image forming apparatus includes a driver installation mode configurable to a USB connection configuration protocol, a wired network connection configuration protocol, and a wireless network connection configuration protocol, and
invoking the guild icon for the first and additional image forming apparatuses wherein the invocation performs the steps of executing on the discovered image forming apparatus, a network configuration operation and/or a driver installation operation associated with first and additional image forming apparatuses.

14. The storage medium according to claim 13, wherein ascertaining the network configuration associated with the first image forming apparatus and the additional forming apparatus and dynamically altering the appearance and performance of an associated guide icon for driver installation for each image forming apparatus further comprise:
parsing the first device feature information or the second device feature information and, according to parsing result, determining the first image forming apparatus is a wireless network image forming apparatus or a wired network image forming apparatus; and
according to determining result, directing the guide icon for driver installation of the wireless network image forming apparatus or the wired network image forming apparatus to be highlight-displayed or gray-displayed.

15. The storage medium according to claim 14, wherein, after directing the guide icon of the driver installation of the wireless network image forming apparatus or the wired network image forming apparatus to be highlight-displayed or gray-displayed, the method comprises:
when one image forming apparatus is discovered, obtaining user operation instruction from the highlight-displayed guide icon and prompting device information of the image forming apparatus;
when one image forming apparatus is discovered, obtaining user operation instruction from the gray-displayed guide icon and displaying prompt information to guide a user to perform a connection operation of the image forming apparatus; and
when multiple image forming apparatuses are discovered, obtaining user operation instruction from the highlight-displayed guide icon and displaying device information of the multiple image forming apparatuses to direct the user to select an image forming apparatus to perform a network configuration operation and/or a driver installation operation based on the device information of the multiple image forming apparatuses.

16. The storage medium according to claim 13, wherein ascertaining the network configuration associated with the first image forming apparatus and the additional forming apparatus and dynamically altering the appearance and performance of an associated guide icon for driver installation for each image forming apparatus further comprise:

parsing the first device feature information or the second device feature information array and, according to parsing result, determining the first image forming apparatus is a wireless network image forming apparatus or a wired network image forming apparatus; and when according to parsing result, the first image forming apparatus is determined to be the wired network image forming apparatus and the first image forming apparatus has a wireless network communication interface, directing the guide icon of the driver installation of the wireless network image forming apparatus to be highlight-displayed or gray-displayed.

\* \* \* \* \*